United States Patent [19]

Francis

[11] 4,036,029

[45] July 19, 1977

[54] AIR CONDITIONING UNIT FOR AUTOMOBILES

[76] Inventor: Philip L. Francis, 4812 Estrada Da Costa, Sarasota, Fla. 33581

[21] Appl. No.: 590,324

[22] Filed: June 25, 1975

[51] Int. Cl.² ............................................. B60H 3/04
[52] U.S. Cl. ....................................... 62/243; 62/499; 74/242.14 R; 74/242.8; 123/41.19; 180/53 R
[58] Field of Search ................... 123/41.19; 180/53 R; 74/242.14 R, 242.8; 62/239, 243, 499

[56] References Cited

U.S. PATENT DOCUMENTS

| 983,010 | 1/1911 | Vinzent et al. | 62/499 X |
|---|---|---|---|
| 1,273,653 | 7/1918 | Orr | 62/499 X |
| 3,209,550 | 10/1965 | Charron et al. | 62/243 X |
| 3,325,095 | 6/1967 | Mueller et al. | 74/242.8 X |
| 3,456,454 | 7/1969 | Kantor | 62/499 X |

Primary Examiner—Ronald C. Capossela
Attorney, Agent, or Firm—Rohe Meyer

[57] ABSTRACT

This invention relates primarily to an air cooling apparatus primarily adapted for use in automobiles and comprises a unitary structure consisting of a compressor, condenser and evaporator, all connected to perform their normal operations in the cooling of air and which combined unit is rotated from the crankshaft of an automobile through a unique system of mountings and connections, wherein an adjustable strut structure is provided for supporting one end of the rotating compressor, condenser and evaporator and which supporting strut structure may be attached to an existing automobile with comparative ease, the strut structure also provided with means for maintaining the proper tension on the belt connecting the shaft to the crankshaft of the engine. The outlet end of the rotary combined compressor, condenser and evaporator, that is, the discharge of the evaporator is connected to a tube that is rigidly attached to the firewall or dash of an automobile with its outlet opening into the passenger compartment of the automobile. Coaxially enveloped by this tube is a second tube used to return the air from the passenger compartment to the evaporator.

8 Claims, 13 Drawing Figures

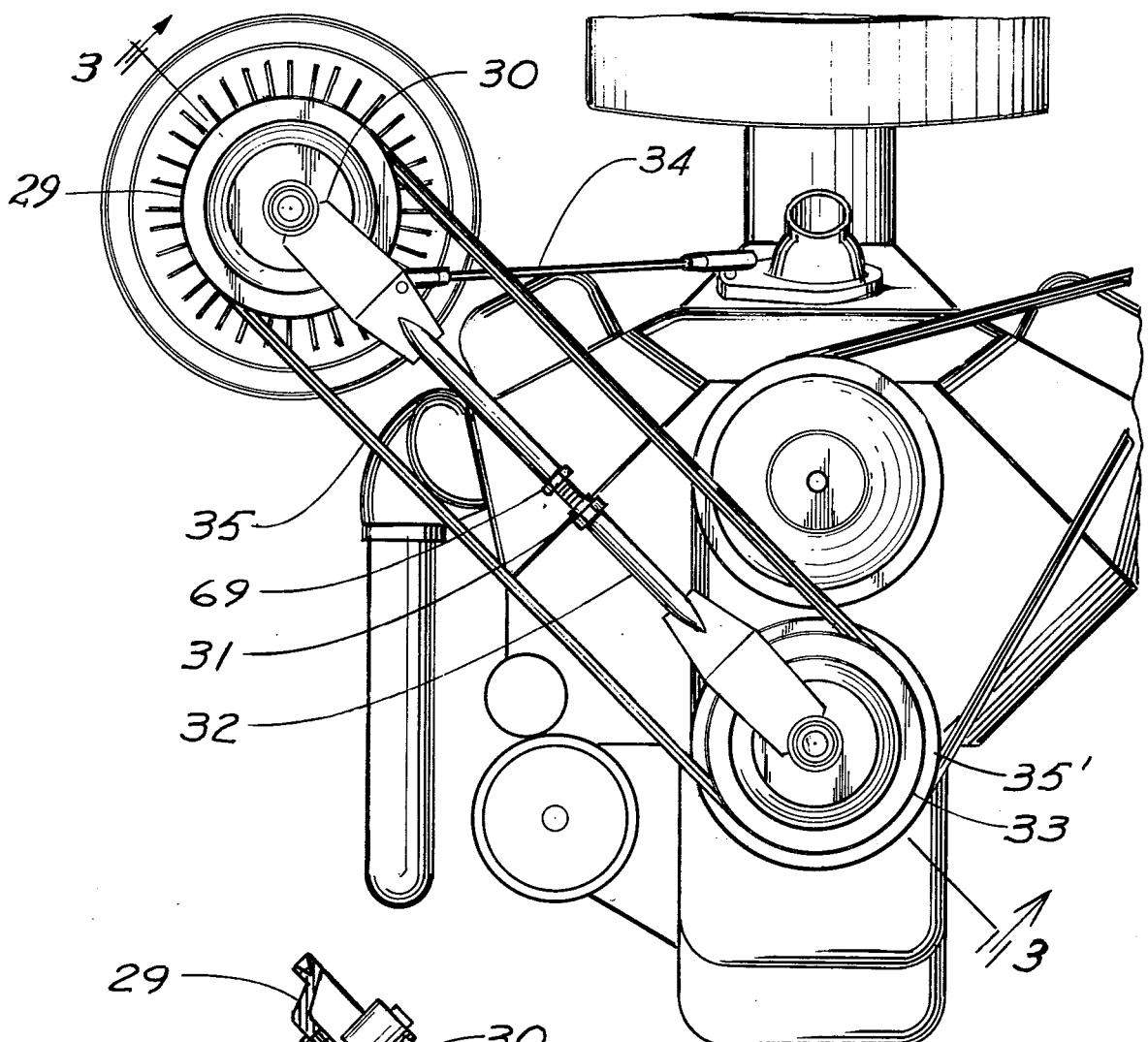
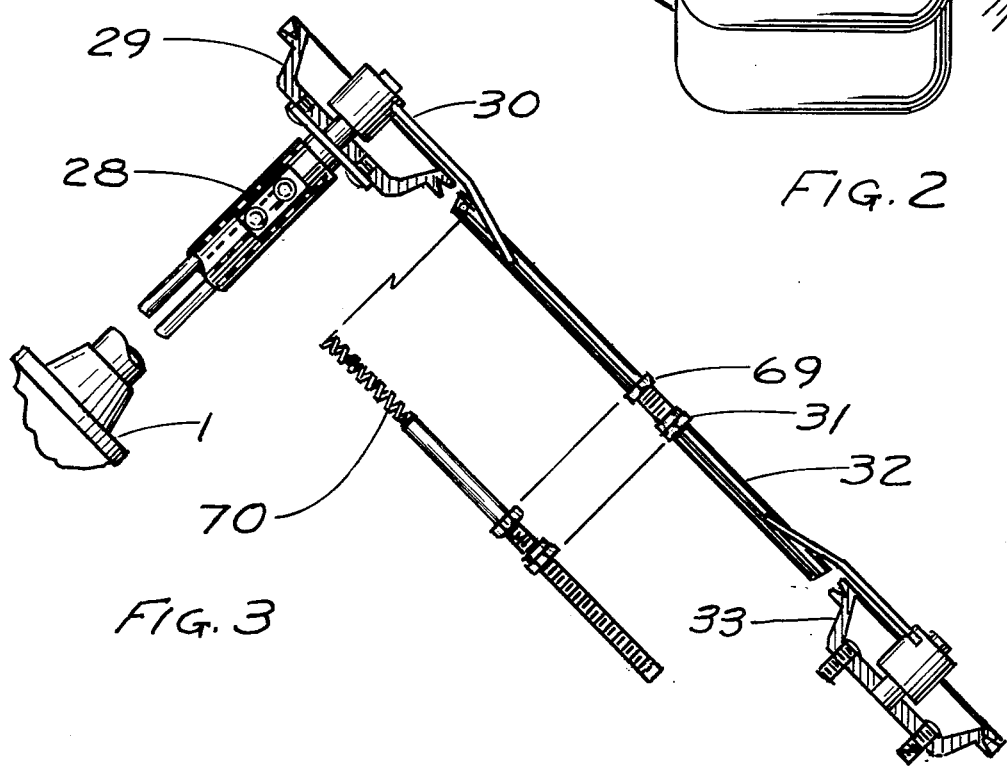
FIG. 2
FIG. 3

AIR CONDITIONING UNIT FOR AUTOMOBILES

An object of the present invention is to provide a compact, efficient air cooling or refrigerating apparatus consisting of a compressor, a condenser and evaporator all connected and mounted as a single unit, together with means for rotating this unit from the crankshaft of an automobile engine without requiring any alteration or replacing of the driving and control mechanism of the automobile. The discharge of the cool air entering the passenger compartment of the automobile through the firewall or dash board of the automobile.

Another object of the invention is to provide in an air cooling and chilling device, means whereby the passenger compartment air entering the evaporator may be redirected so as to pass continuously through the evaporator when atmospheric conditions are such as not to require cooling of the passenger compartment of the automobile.

The primary object of the invention is to reduce the number of components and form a compat simplified air chilling device.

Another object of the invention is to provide means comprising the driving and supporting structures of the rotary air chilling unit which may be comparatively easy and inexpensively mounted in the power compartment of an automobile and may also be easily disconnected to permit the removal of the air chilling apparatus from one automobile to another, if desired.

Other objects of the invention consists in so construting and arranging the parts of the rotary air chilling or cooling unit so as to prevent the escape of refrigerant and to so construct the compressor that lubrication of the compressor moving parts may be effectively maintained without requiring usual oil sump and quantity of oil required in known types of reciprocating types of compressors.

With these and other objects in view, as may appear from the accompanying specification, the invention consists of various features of construction and combination of parts, which will be first described in connection with the accompanying drawings, showing an Air Conditioning Unit for Automobiles of a preferred form embodying the invention and the features forming the invention will be specifically pointed out in the claims.

In the drawings:

FIG. 2 is a front elevational view of a vehicle's engine incorporating the invention.

FIG. 3 is a fragmentary sectional view taken along line 3—3 of FIG. 2.

Figure 1:
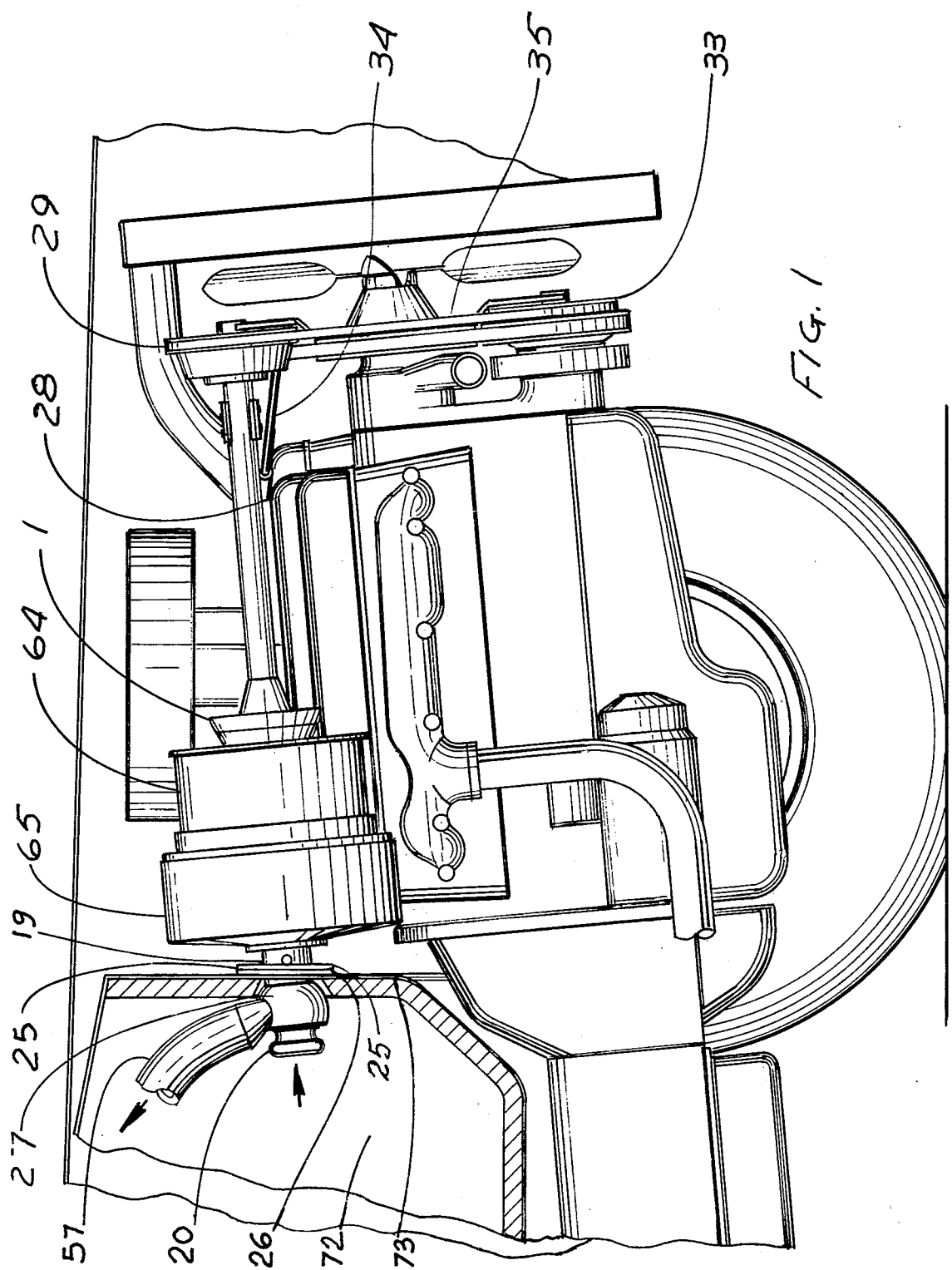
FIG. 1 is a side elevational view, partially in section, of a vehicle's engine compartment incorporating the invention.
Figure 4:
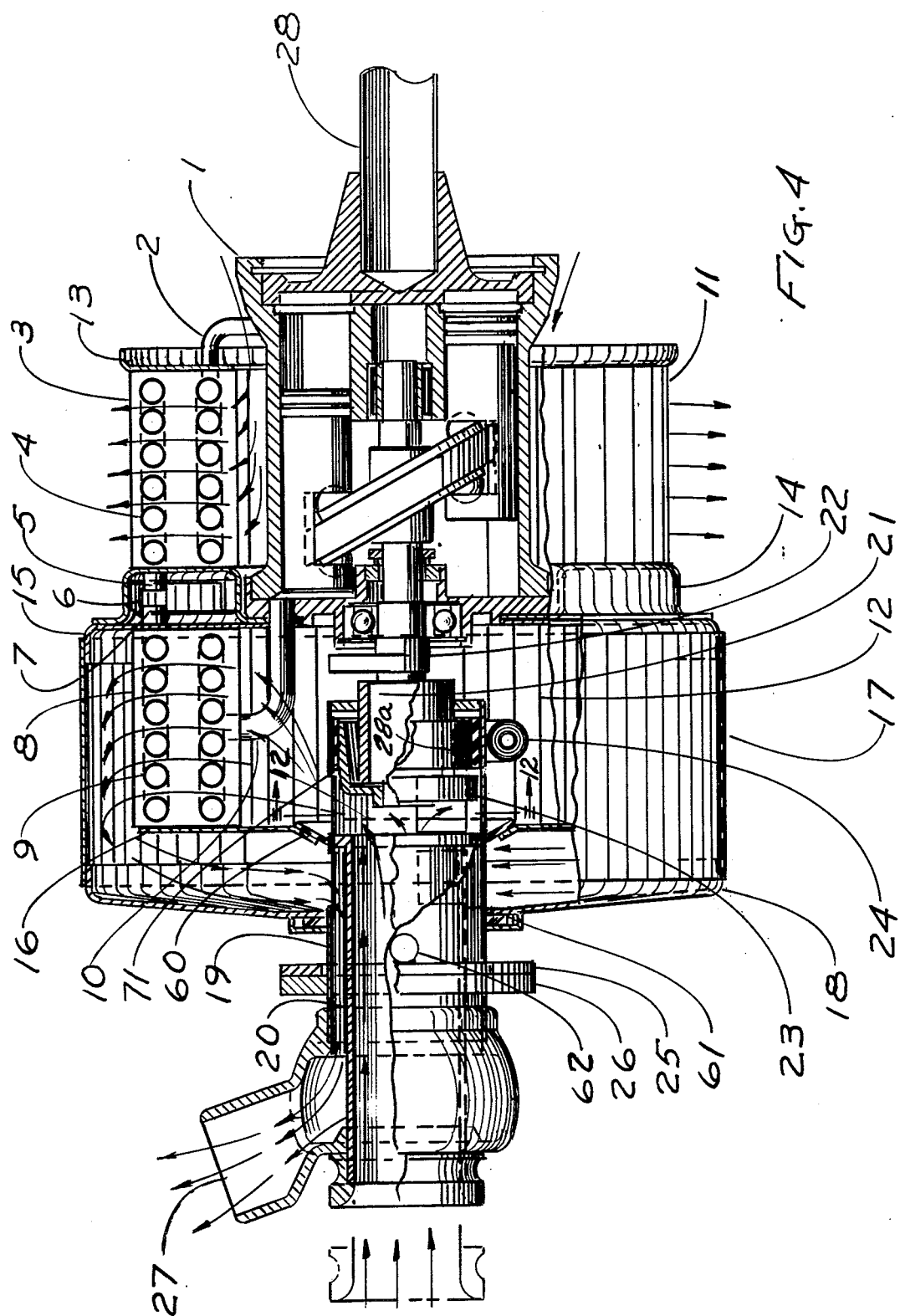
FIG. 4 is a longitudinal section through the refrigerating apparatus.

The device described herein consists of the normal automotive vapor compression cycle components, namely, compressor 1, condenser 4, receiver 6, throttling valve 7 and evaporator 9.

The novelty of the device consists of (A) The use of rotating heat exchangers, (B) Unique compressor operation, (C) The manner of installation of the device, (D) Air distribution and blower system, (E) Operation control both thermodynamically and seasonal.

Amplifying on the above mentioned features we have

A. The evaporator 9 and condenser 4 utilized by this device are both rotational in operation. The use of this type of heat exchanger produces two advantages. First, they have greater heat transfer at low vehicle or engine speed. Second, the use of fans and blowers are not required.

B. The compressor used in this system is similar to those found in what can be called the normal air conditioning installation. The main difference in application is that instead of the normal stationary cylinder block and revolving crankshaft we rotate the cylinder block and restrain the crankshaft from turning. In so doing we preclude the use of a high pressure rotating seal between the compressor and condenser and replace the rather expensive clutch with a simple brake for compressor duty cycling.

C. After reading the two foregoing descriptions of features, one can see that the major components, compressor 1, condenser 2, and evaporator 9 all rotate. It must now be obvious that the simplest configuration these components can take is to be mounted on a single shaft and rotated as a single unit. The circular shaped evaporator 9 and condenser 2 with the compressor 1 concentrically enveloped in it are made up and charged with refrigerant as a unit at the factory.

D. With the addition of radial vanes 11 and 12 on the perimeters of the condenser 2 and evaporator 9 respectively, the rotating heat exchanger can be employed as a centrifugal blower. The blower action can be used to induce a greater flow of air through the heat exchanger and also provide pressurized air flow through the air distribution section of the air conditioning system. These radial vanes 11 and 12 are also used as cooling fins for the tube coils of the condenser 4 and the evaporator 9.

E. During the air conditioning season, control of the cooling effect of the air conditioning system is accomplished by both the on and off cycling of the compressor 1, through manual or thermostatic controlled operation of the compressor brake 23 and by the manual control of the air flow through the evaporator 9. The periods when no air conditioning will be required, for long lengths of time, the system can be removed from service by simply disconnecting the drive at the pulley 29.

The air conditioning unit we will attempt to describe is composed of all the foregoing features, but one should not construe that the novelty and usefulness of any of these features is impaired by its use individually or in any combination not now mentioned. Starting at the front of the unit we have a driven pulley 29 which is connected by driving belt 35 to the engine's crankshaft 35' mounted drive pulley 33. The driven pulley 29 is supported by an extendible tube or strut 68. This strut assembly is fastened to both pulleys 29 and 33 by way of bearings 30 and 32. It can be seen that the weight of pulley 29 and any drive torque reaction will be transmitted down the strut structure 68 and into the engine's crankshaft 35'. The extendible quality of this support strut also allows it to be used as a drive belt 35 tensioner. A strut length adjusting nut 31 is provided as shown in FIG. 2 to adjust the length of the strut as required. It is understood that the strut is made up of telescopic sections and a belt tensioning spring 70 is connected through suitable means to each of these sections to provide proper tension of the belt 35. A shaft 28 from the driven pulley 29 runs toward the rear of the engine compartment substantially parallel to the engine's crankshaft 35'. At the rear end of this shaft 28 and attached rigidly to it by cylinder head 36, is the compressor 1. The circular shaped condenser 64 and receiver 6 which are connected by suitable pipe 5 circumferentially envelop and are supported by the compressor. The distributing manifold 3 of the condenser is connected by the pipe 2 to the discharge of the compressor 1. The circular shaped evaporator 65 is mounted at the rear of the condenser-receiver package and embodies a manifold 8 into which it delivers the evaporator refrigerant and from which the evaporated refrigerant passes through a pipe 10 to the intake of the compressor where it is recompressed and discharged into the condenser. The evaporator 65 is of the tubular type embodying tubes 9 and the condenser includes front and rear plates 13 and 14.

The evaporator and the condenser have radial vanes thereon for stimulating circulation of air for the purpose hereinafter stated. The evaporator 65 is covered by a housing or closure, consisting of 15, 16, 17 and 18. It can be seen that when the engine is running the pulleys, shaft, compressor, condenser, receiver, evaporator and evaporator closure all rotate as one unit. This rotating unit is supported at the front end by the driven pulley 29 and at the rearby a bearing 21 inserted in the rear support and air conducting tube 19 attached to and penetrating the dash or firewall 73 of an automobile. From the side view it can be seen that the free standing driven pulley 29 and extendible strut 68 is stable because the rear end of the package is attached to the dash or firewall 73 of an automobile. Viewed from the front, however, the free standing driven pulley 29 and extendible strut 68 must be supported and stabilized and the reaction force produced by the drive belt 35 must be assimilated. The support and stabilization of the system is easily accomplished by the use of a simple radius rod 34 extending between the upper end of the extendible strut 68 and any suitable spot on or near the front of the engine. The tube 19 in conjunction coaxially with another tube 20 act as a rear support for the unit, the torque reaction member for the compressor's crankshaft brake system and the air ducts to transmit the air conditioning air to and from the passenger compartment.

Figure 12:
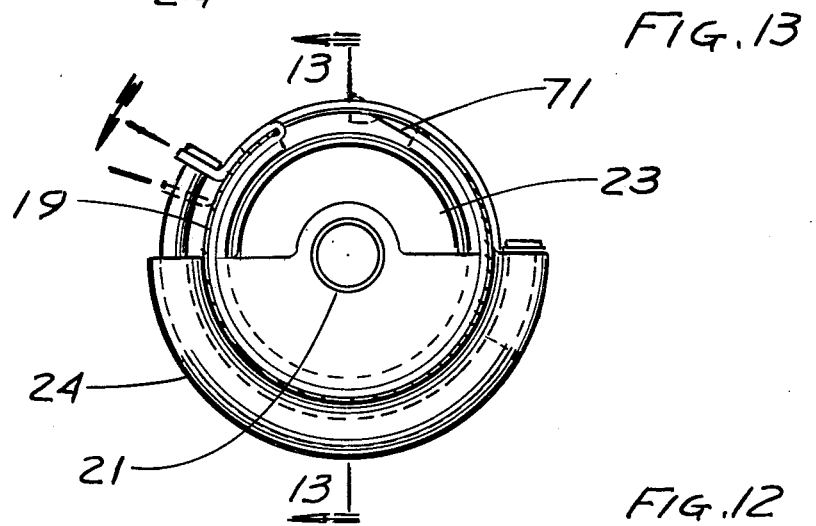
FIG. 12 is a fragmentary sectional view taken along line 12—12 of FIG. 4.

When operating in the non-refrigerating mode the package will be rotating with air passing through both the condenser 64 and evaporator 65 induced by the centrifugal blower effect. As the compressor shaft brake 28a (as shown specifically in FIG. 12 of the drawing) is disengaged, no refrigerant is being sent through the system. The air that is being induced through the evaporator 65 is not being cooled and perhaps not being sent into the passenger compartment. If the air leaving the evaporator 65 is not needed in the passenger compartment it is simply diverted, (by placing the inner air duct tube 20 in the air recirculating position), to the inlet side of the evaporator and sent on through it in an endless circle. When refrigeration is wanted the compressor 1, condenser 2 and evaporator 9 operate in much the same manner as previously described with the exception that the compressor's shaft is restrained from turning by the crankshaft brake 28a (as shown specifically in FIG. 12 of the drawing) which can be thermostatically or manually operated. When the shaft 28 is prevented from turning with the compressor the compressor is in operation. The shaft 28 is provided with suitable counterbalances 22 and 23. The counterbalance 23 formsa brake drum for braking rotation of the compressor and such braking action is controlled by a solenoid brake actuator 24 which may be actuated either by a thermostat (not shown) or by suitble manual means (not shown). The compressed gas is sent from the compressor 1 through pipe 2 into the condenser 64 where it is condensed and then stored in the receiver 6 as a liquid. From the receiver 6 it passes through the throttling valve 7 and into the evaporator 65 where it expands and absorbs the heat from the passenger compartment air. The gas then returns to the compressor 1 by way of pipe 10. The warm moist air from the passenger compartment enters the evaporator through the inner air duct tube 20. The air then passes through the evaporator and returns, cool and dry, to the passenger compartment through the rear support and air duct tube 19. The circulation of this air is induced by the centrifugal blower action of the evaporator 9 as it rotates. The temperature in the vehicle is controlled by cycling the compressor and by controlling the air flow through the evaporator.

Figure 9:
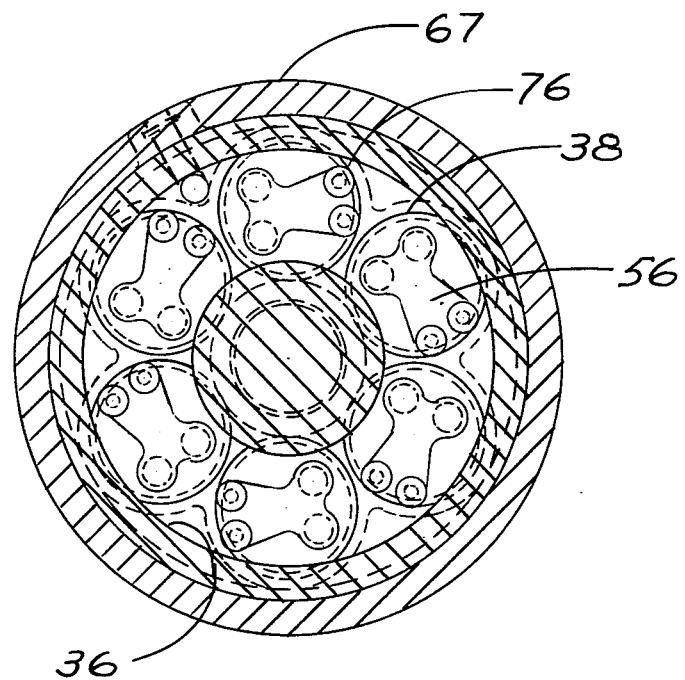
FIG. 9 is a view in vertical cross section along line 9—9 of FIG. 7.
Figure 10:
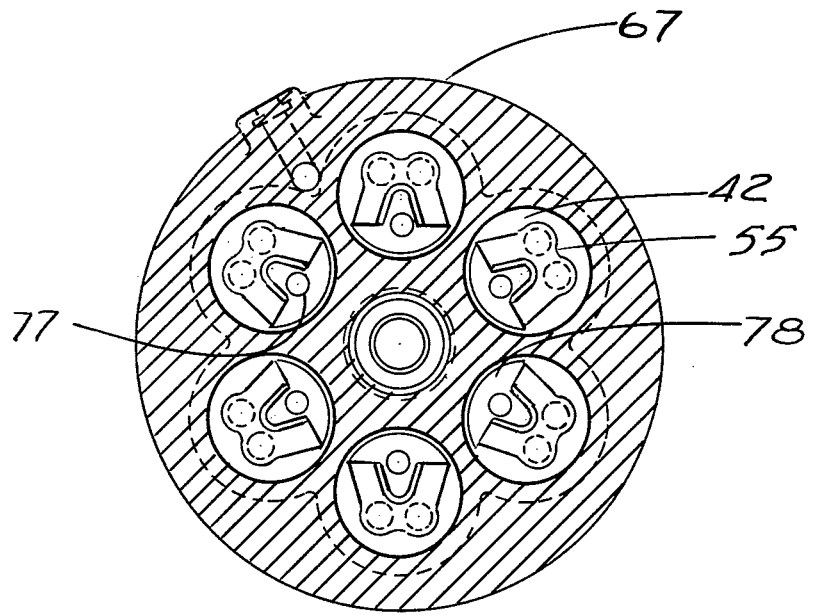
FIG. 10 is a view in vertical cross section along line 10—10 of FIG. 7.
Figure 11:
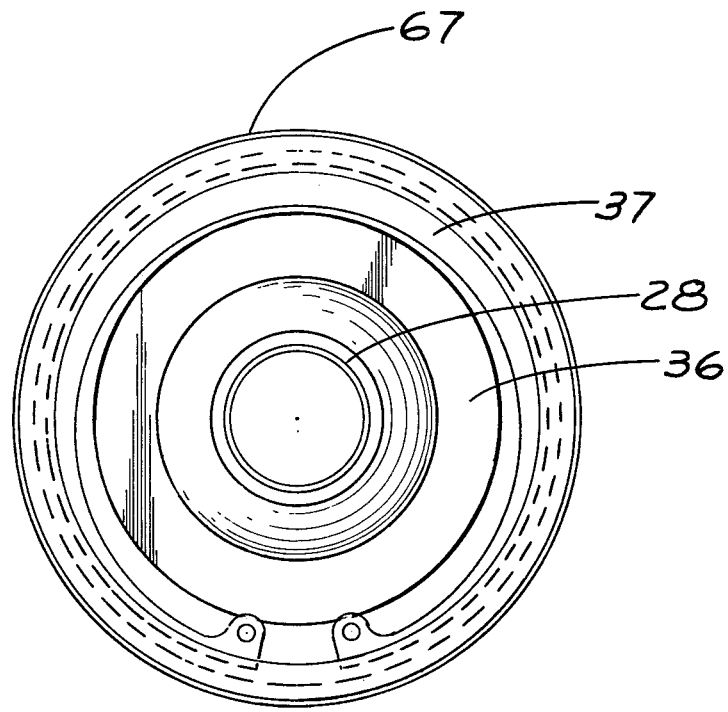
FIG. 11 is a front elevation of compressor FIG. 8.
Figure 13:
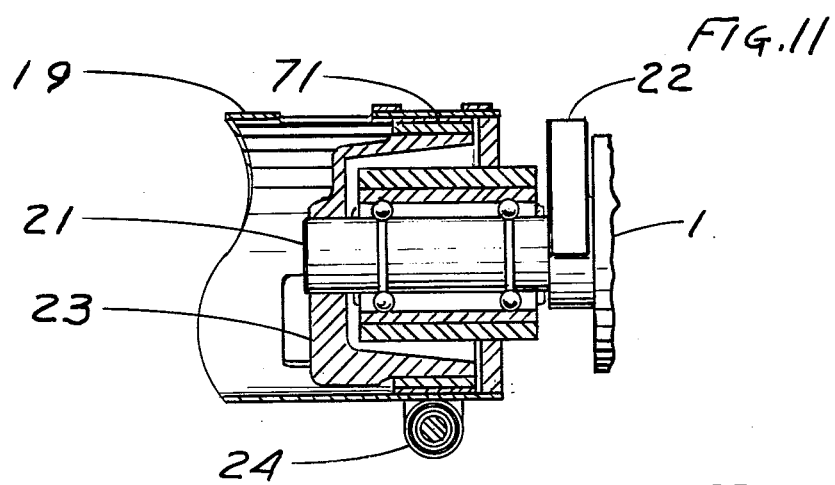
FIG. 13 is a fragmentary sectional view taken along line 13—13 of FIG. 12.

The compressor 6 which is shown individually in FIGS. 7, 8, 9 and 10 comprises an outer cylindrical casing or housing 67 which is rotated by drive shaft 28 connected to its rear end. Within the compressor housing are a series of radially disposed cylinders as shown in FIGS. 9 and 10 of the drawings, in which pistons 42 reciprocate. These pistons have any approved type of piston rings 43. The compressor cylinder head 36 has a series of discharge valves 56 therein, one for each piston 42 of the compressor and these discharge valves 56 have suitable retaining means consisting of retainer pins 76. Inlet valves 55 are retained in their proper positions by retainers 78 and the screw 77.

The pistons 42 are reciprocated by means of a swash plate 51 mounted on the shaft 21 through the medium of the semispherical swash plate carried members 54 when the shaft 21 is rotating. Control of rotation of the shaft 21 is maintained by means of suitable brake mechanism, the counterbalancing brake drum 23 and the solenoid operated brake actuator 24 which as previously stated can be either operated manually or operated by a thermostat as desired.

Figure 5:
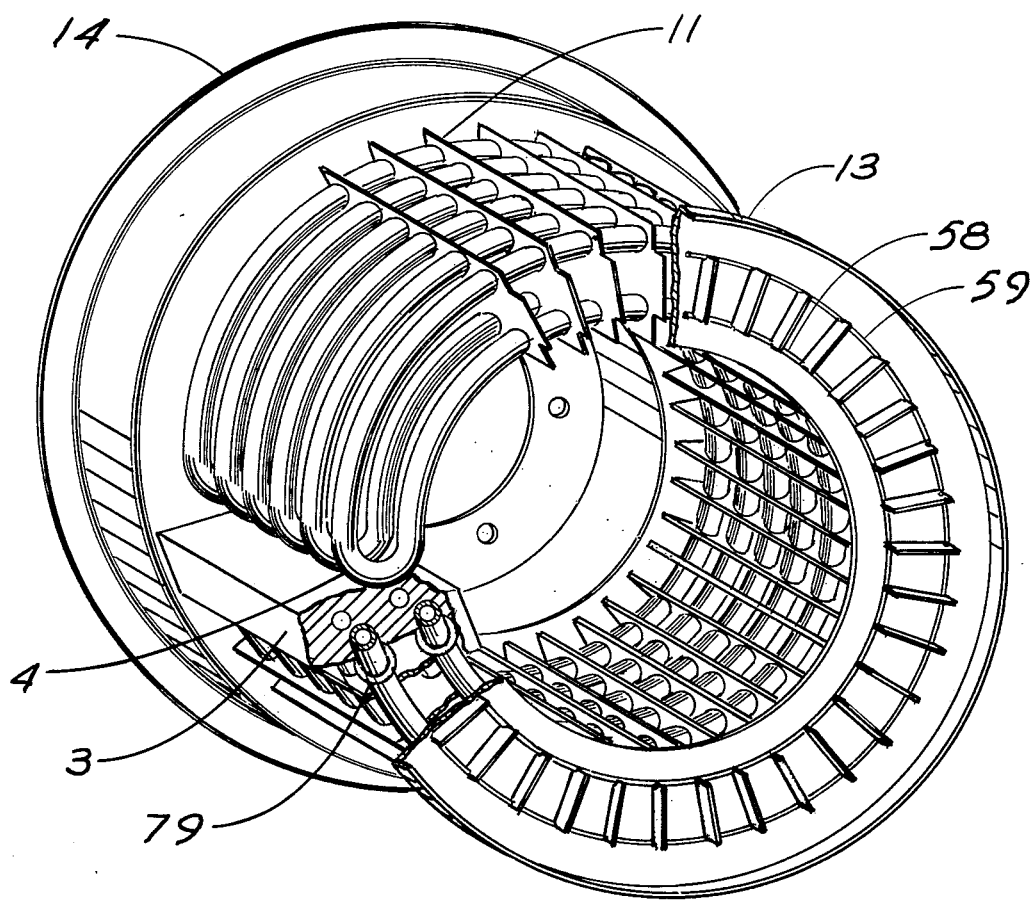
FIG. 5 is a cutaway perspective of the condenser.
Figure 6:
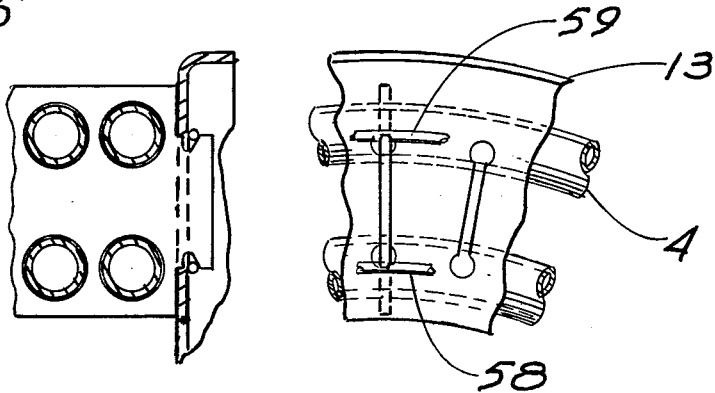
FIG. 6 is a fragmentary view and section of the condenser or evaporator, in detail.
Figure 7:
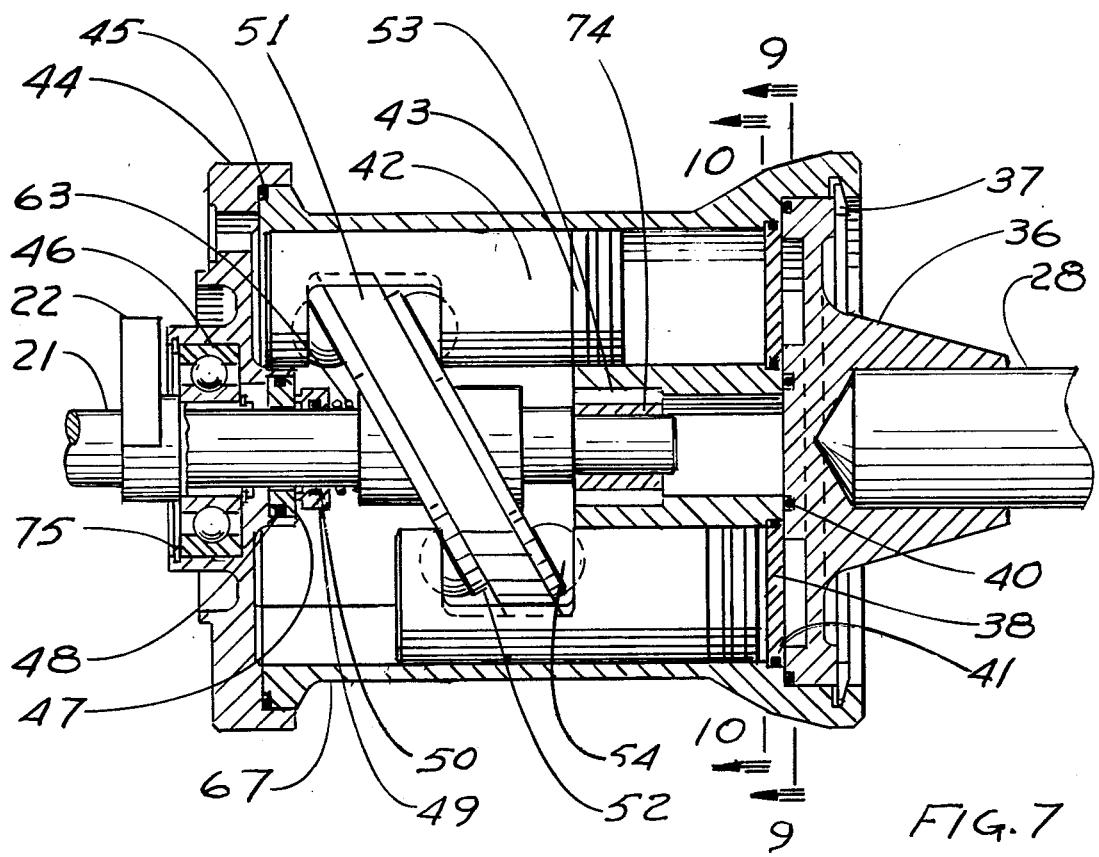
FIG. 7 is a longitudinal section through the compressor.
Figure 8:
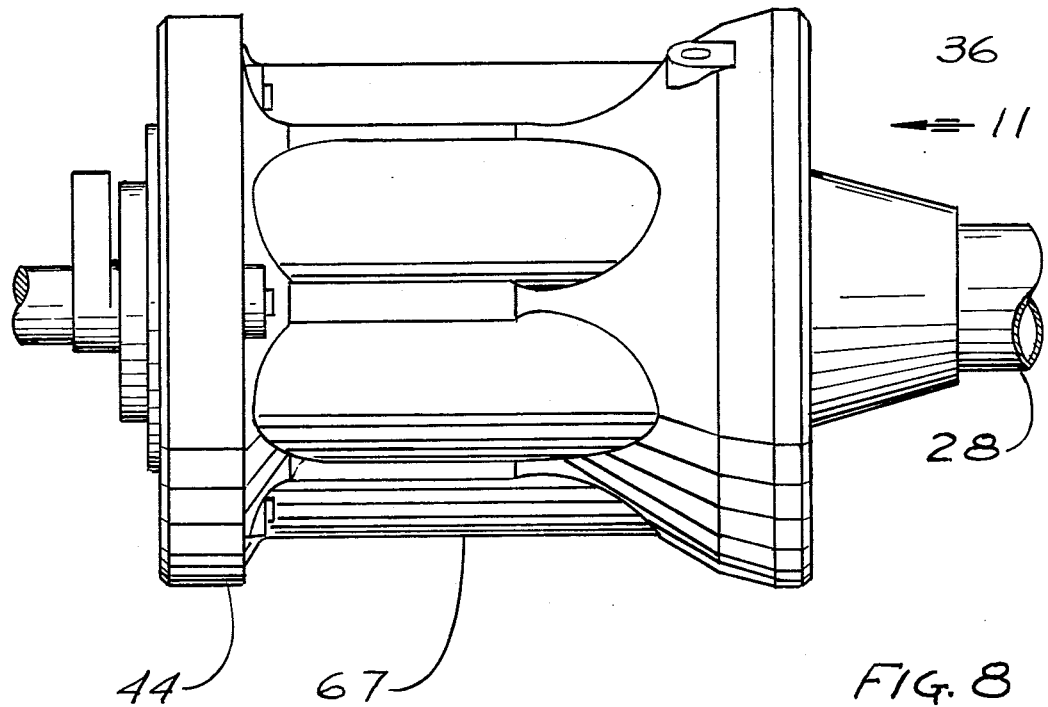
FIG. 8 is a side elevational view of the compressor.

The condenser 2 is of unique construction comprising two circular or ring like sides or plates 13 and 14 between which extend the vanes 11. The plates 13 and 14 are provided with circumferentially spaced openings through which the ends of the vanes extend and these ends of the vanes are engaged by inner and outer retaining wires 58 and 59 as shown in FIGS. 5 and 6 of the drawings.

As it was stated on, one of the objects of this invention was to produce a compressor that needed minimal lubrication. A description of the compressor conforming to this object forms a developed for this system follows.

The fact that the compressor used by this device requires it to rotate around its own shaft, it is necessary to utilize a device that is balanced around the shaft axis. Most reciprocating type compressors can be balanced by using a large amount of weight that has no other function but to balance the compressor's mass. This produces an uneconomical package from both the weight and size considerations. A device that in its normal configuration is built concentrically around its shaft is a more desired type of mechanism for our needs.

As the complete air cooling package, including the compressor, rotates it also becomes necessary to consider the centrifuge effect of the device. It can be seen that if the compressor was of normal construction a large amount of oil would be required to maintain lubrication of the moving parts. This oil would no doubt migrate to the outer circumference of condenser, receiver and evaporator and would not return to the compressor for use as the lubricant. As the refrigerant used is miscibil with oil we can lubricate the compressor much as a two stroke cycle, crankcase scavanged, internal combustion engine is lubricated. A quantity of oil, up to the miscibility level of the refrigerant used, will be premixed with it and will be introduced into the system at the time of initial charge. The internal rubbing parts of the compressor will be made of material that this marginal lubrication will be more than required. Because of the need of concentricity and lack of a normal amount of lubrication the swash plate 51 mechanism was selected to be used as the compressor for this package. Without an oil sump the swash plate compressor is inherently concentric and because of the large bearing surfaces at our disposal the mechanism can be designed with very low unit bearing loading.

In installing the air conditioning or cooling unit in an automobile a hole is cut in the firewall or dash 73 of the automobile and this opening is closed by a plate 25 which forms a support for the air distributing tube 19. A suitable heat and vibration insulating plate 26 is provided to reduce transmission of heat and vibration into the passenger compartment from the engine compartment of the automobile into the passenger compartment 72 and a distributer 27 is connected to the tube 19 to distribute air from the evaporator through the hose 57 into the passenger compartment of the automobile.

The compressor cylinder head is retained by suitable retaining ring 37 and the compressor valves are carried by a suitable plate 38. The rear bearing of the compressor is supported by suitable support shown at 44 and a suitable bearing 46 for the rear of the compressor is provided.

69 is a threaded or screw length provided on the strut 31 to permit adjustment of its length as required.

A brake band 71 is provided for braking the rotation of the compressor shaft as hereinbefore described.

A knuckle pin 62 is welded to the rear support plate 25 and provides in effect a universal joint with the firewall or dash to compensate for vibration of the automobile engine.

Various details of construction which go into the making up of the efficiency and are necessary to the proper operation of the apparatus but in that they relate to specific details of construction are shown, such as: the outer sealing for cylinder head 39; inner sealing ring for cylinder head 40; ceiling ring 41 for valve plate; sealing ring 45 for compressor rear bearing; a seal 47 for the compressor shaft seat; sealing ring 48 for the compressor shaft seat; seal 49 for the compressor shaft; sealing ring 50 for the compressor shaft seal; bearing 52 for the swash plate; bearing 53 for the front o the compressor; seal 60 for the rear plate of the evaporator; seal 61 for the evaporator shroud or closure plate; 63 indicates a spring for the shaft seal; 74 indicates the race for the front compressor bearing and 75 indicates a retaining ring for the rear compressor bearing; 79 indicates the sealing ring for the evaporator and condenser.

It will be understood that the invention is not to be limited to the specific construction or arrangement of parts shown, but that they may be modified within the invention defined by the claims.

What is claimed is:

1. An air conditioning unit comprising a compressor condenser and evaporator, an outer casing for said compressor, said condenser and evaporator circular in shape and mounted upon the outer casing of said compressor, a shaft for rotating said compressor condenser and evaporator as a single unit, said shaft for rotating the compressor connected to one end of said outer casing of the compressor, said compressor casing including a plurality of interior cylinders, pistons reciprocally mounted in said cylinders, a second shaft extending through the compressor, means on said second shaft for reciprocating said pistons, a brake for controlling rotation of said second shaft whereby the reciprocation of said pistons may be controlled independently of rotation of the compressor casing.

2. An air conditioning unit as claimed in claim 1, including means whereby the air discharged by the evaporator may be returned to the evaporator for continuous circulation therethrough.

3. An air conditioning unit as claimed in claim 1, including manually operated solenoid operated means for operating said brake.

4. An air conditioning unit as claimed in claim 1, said condenser and evaporator being of the tube type and having their tubes enclosed in suitable housings or walls of a plurality of vanes on the outer circumference of the condenser and evaporator to create a blower or fan effect to stimulate the circulation of air.

5. An air conditioning unit as claimed in claim 1, wherein said condenser comprises tubular coils for the circulation of compressed gas therethrough, side walls enclosing said tubular coil and a plurality of vanes connected to and extending between said side walls for creating a blower effect during the rotation of the condenser.

6. An air conditioning unit as claimed in claim 1, wherein the side walls of the condenser have a plurality of circumferentially spaced openings near their outer circumference, said vanes having extensions on their ends which project through said openings and wire rings engaging said vane extensions and rigidly holding the vanes in detachable connection with the side walls of the condenser.

7. In combination with an automobile including an engine compartment and a passenger compartment and a firewall separating said compartments, a driving engine for the automobile in the engine compartment, a crank shaft driven by said engine, an air conditioning unit mounted in said engine compartment and comprising a compressor a condenser and an evaporator all connected to rotate as a unitary unit, a driving shaft connected to said rotary air conditioning unit, a driving pulley mounted on said driving shaft, a strut supporting said driving shat and rigidly connected at its end remote from the driving shaft to a stable part of the automobile in which the unit is mounted, a belt connecting said driving pulleys, means on the strut for regulating the tension of the belt, said strut and first driving shaft forming a support for the forward end of the compressor condenser and evaporator unit, an air distribution tube for delivering air from the evaporator and rigidly connected to the firewall of the automobile on which the air conditioning unit is mounted, said distribution tube forming a support for the rear end of the rotating compressor condenser and evaporator unit.

8. An air conditioning unit as claimed in claim 7, including means associated with said air distributing tube and acting to absorb vibration of the operating engine of the automobile and to absorb the torsional reaction of the load when the unit is operating in air condition operation.

* * * * *